United States Patent
Eifert et al.

(10) Patent No.: US 10,381,692 B2
(45) Date of Patent: Aug. 13, 2019

(54) METHOD FOR MONITORING THE STATE OF A BATTERY IN A MOTOR VEHICLE

(71) Applicant: FORD GLOBAL TECHNOLOGIES, LLC, Dearborn, MI (US)

(72) Inventors: Mark Eifert, Frankfurt am Main (DE); Eckhard Karden, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 560 days.

(21) Appl. No.: 14/874,143

(22) Filed: Oct. 2, 2015

(65) Prior Publication Data
US 2016/0104920 A1    Apr. 14, 2016

(30) Foreign Application Priority Data
Oct. 9, 2014    (DE) .................. 10 2014 220 515

(51) Int. Cl.
*H02J 7/00* (2006.01)
*H02J 7/14* (2006.01)
(Continued)

(52) U.S. Cl.
CPC ......... *H01M 10/443* (2013.01); *B60L 3/0046* (2013.01); *B60L 3/04* (2013.01);
(Continued)

(58) Field of Classification Search
USPC ....... 320/104, 107, 108, 134, 150, 162, 152, 320/109, 137, 153, 136, 151, 163, 106,
(Continued)

(56) References Cited

U.S. PATENT DOCUMENTS 5,309,080 A    5/1994    Odendahl et al.
5,652,502 A *  7/1997    van Phuoc ......... G01R 31/3655
                                                        320/134
(Continued)

FOREIGN PATENT DOCUMENTS

CN    1157834 C    7/2004
DE    3736069 A1   5/1989
(Continued)

*Primary Examiner* — Alexis B Pacheco
(74) *Attorney, Agent, or Firm* — Frank Lollo; Brooks Kushman P.C.

(57) ABSTRACT

The disclosure relates to a method for monitoring the state of a battery. In the process, the internal temperature of the battery during a charging process is determined in defined intervals at different time points, and an evaluation unit continuously determines a temperature gradient at least from the temperature values. At least one limit value for the temperature gradient is stored in the evaluation unit, and the evaluation unit generates a signal when the temperature gradient which is determined by the evaluation unit reaches this limit value. When this signal from the evaluation unit is present, the charging voltage of the battery is driven such that there is no battery current, while the internal temperature of the battery is further periodically detected, and the evaluation unit generates an alarm signal when the temperature has fallen after suppression of the battery current.

12 Claims, 1 Drawing Sheet

(51) Int. Cl.
   *H01M 10/44* (2006.01)
   *H01M 10/48* (2006.01)
   *B60L 3/00* (2019.01)
   *B60L 3/04* (2006.01)
   *B60L 58/25* (2019.01)

(52) U.S. Cl.
   CPC ........... *B60L 58/25* (2019.02); *H01M 10/486* (2013.01); *H02J 7/0029* (2013.01); *H02J 7/0091* (2013.01); *B60L 2240/545* (2013.01); *B60L 2250/10* (2013.01); *H01M 2220/20* (2013.01); *H02J 2007/0039* (2013.01); *Y02T 10/705* (2013.01); *Y02T 10/7011* (2013.01); *Y02T 10/7016* (2013.01)

(58) Field of Classification Search
   USPC .......................................... 320/112, 113, 125
   See application file for complete search history.

(56) References Cited

U.S. PATENT DOCUMENTS

| | | | |
|---|---|---|---|
| 6,172,487 B1 | 1/2001 | Brotto | |
| 6,414,465 B1* | 7/2002 | Banks | H01M 10/48 320/118 |
| 7,391,183 B2* | 6/2008 | Ariga | H02J 7/0075 320/124 |
| 2002/0175659 A1* | 11/2002 | Sakakibara | H02J 7/0091 320/150 |
| 2004/0113629 A1 | 6/2004 | Laig-Hoerstebrock et al. | |
| 2005/0088140 A1* | 4/2005 | Bushong | H02J 7/0045 320/107 |
| 2006/0214639 A1* | 9/2006 | Miwa | H02J 7/047 320/134 |
| 2009/0243540 A1* | 10/2009 | Choi | H02J 7/0016 320/107 |
| 2014/0021914 A1* | 1/2014 | Martin | H02H 5/045 320/109 |
| 2014/0177145 A1* | 6/2014 | Kawahara | H01M 10/441 361/679.01 |
| 2014/0266038 A1* | 9/2014 | Gibeau | B60L 11/1875 320/109 |
| 2014/0266071 A1* | 9/2014 | Tomiyasu | H02J 7/0091 320/150 |
| 2014/0292283 A1* | 10/2014 | Timmons | B60L 11/1809 320/152 |
| 2015/0301552 A1* | 10/2015 | Lim | H02J 7/0052 327/538 |
| 2015/0318720 A1* | 11/2015 | Aradachi | H02J 7/0003 320/106 |
| 2015/0372527 A1* | 12/2015 | Lim | H02J 7/0091 320/150 |

FOREIGN PATENT DOCUMENTS

| | | | |
|---|---|---|---|
| GB | 2359945 A | 9/2001 | |
| JP | WO 2014087676 A1 * | 6/2014 | ............ H02J 7/0003 |

\* cited by examiner

METHOD FOR MONITORING THE STATE OF A BATTERY IN A MOTOR VEHICLE

CROSS-REFERENCE TO RELATED APPLICATIONS

This application claims foreign priority benefits under 35 U.S.C. § 119(a)-(d) to DE 10 2014 220 515.8, filed Oct. 9, 2014, which is hereby incorporated by reference in its entirety.

TECHNICAL FIELD

The disclosure relates to a method for monitoring the state of a battery, in which method the internal temperature of the battery is determined and monitored during a charging process of the battery. The battery which is monitored in this way may be, in particular, a battery in a motor vehicle, wherein the method is suitable, in particular, for monitoring the charging process of batteries of a partially or fully electrically operated vehicle.

BACKGROUND

The starter battery of a motor vehicle is, for example, a rechargeable battery which supplies the electric current for the starter of an internal combustion engine. The battery of an electric vehicle which serves to drive the vehicle is, by contrast, called the traction battery. In addition, electric vehicles or hybrid vehicles can also have a starter battery. The batteries used can be, for example, rechargeable lead-acid batteries or rechargeable lithium-ion batteries which, however, are also called lead-acid batteries or lithium-ion batteries in the text which follows.

When lead-acid batteries or rechargeable lead-acid batteries age and, for example, begin to "emit gas" on account of internal short-circuits or other mechanisms, the temperature of said batteries usually increases. In the event of greatly elevated temperatures, this can lead to the electrolyte beginning to boil and escaping from the battery. In addition, if lithium-ion batteries or rechargeable lithium-ion batteries are damaged, they can likewise become extremely hot on account of internal reactions or current flows. To this end, the state of the battery should be monitored, this being possible on the basis of various parameters.

In order to determine battery state, it is possible, for example, to monitor the battery temperature since this is an indicator of the state of the battery. This is typically performed using a conventional pole-niche sensor which serves as a battery monitoring sensor (BMS). If, for example, the temperature which is measured using this sensor reaches a specific limit value, a critical state of the battery is assumed.

However, the battery temperature can also be used in other ways when determining the level of wear of a battery. For example, EP 1 387 177 A2 discloses a method for determining the level of wear of an electrochemical energy store, in which method a wear variable with respect to time is determined depending on the battery temperature. In this case, the wear variable is determined as the sum with respect to time of temperature-dependent amounts of wear, wherein there is an over proportionate increase in the values of the amounts of wear as the temperature rises. Therefore, the over proportionate influence of increasing battery temperatures on the level of wear of the battery should be taken into account.

Vehicle systems in the deep low-voltage range (14 to 48 V) are usually separated from electrical drive systems, as can be found in electric vehicles and hybrid vehicles. However, battery monitoring is not common in low-voltage systems of this kind. However, battery monitoring has gained new importance on account of a change in user behavior, in particular in respect of unintentional charging of batteries of vehicles overnight in a garage.

When monitoring the battery temperature, for example, by means of a pole-niche sensor however, it should be noted that an increase in the temperature measured there can be affected by various influences. On the one hand, said increase may be attributed to internal heating of the battery, this indicating a weakened or damaged battery. However, it may also be partly or entirely caused by external heat sources. If temperature increases due to external heat sources are not taken into account, a monitoring system of the vehicle would frequently indicate a damaged battery or possibly even disconnect the battery from the voltage source during the course of a risk minimization strategy even though the battery is intact. This should be avoided since it has an adverse effect on the functionality of the vehicle and false alarms lead to customer dissatisfaction.

SUMMARY

The object is therefore to provide a method for monitoring the state of a battery by means of its internal temperature, in which method a distinction can be drawn between elevated battery temperatures due to internal heating of the battery and heating owing to external heat sources. The intention is for the method to be suitable, in particular, for monitoring batteries for low-voltage systems of a vehicle.

It should be noted that the features specified individually in the claims may be combined with one another in any desired technologically meaningful way and disclose further embodiments. The description, in particular in conjunction with the figures, characterizes and specifies embodiments further.

In the method for monitoring the state of a battery, the internal temperature of the battery during a charging process of the battery is continuously determined and monitored. In particular, it is provided that the internal temperature (T) of the battery during a charging process is determined in defined intervals at different time points (k) and transmitted to an evaluation unit which continuously determines a temperature gradient ($T_{Grad}$) at least from the temperature values (T1, T2) determined in this way by dividing the change in temperature ($\Delta T$) in an interval by the change in time ($\Delta t$) in this interval. At least one limit value (S1) for the temperature gradient ($T_{Grad}$) is stored in the evaluation unit, wherein the evaluation unit generates a signal when the temperature gradient ($T_{Grad}$) which is determined by the evaluation unit reaches this limit value (S1). When this signal from the evaluation unit is present, the charging voltage of the battery is driven such that there is no battery current, that is to say no current flows to or from the battery. However, the internal temperature (T) of the battery is further periodically detected, and the evaluation unit generates an alarm signal if the temperature (T) drops after the battery current is suppressed.

As soon as the temperature gradient exceeds a limit value, zero-current control is therefore activated, this lowering the battery current to zero. If the temperature then drops further, it can be assumed that the previous temperature increase was not caused by external heat sources, but rather by internal heating of the battery. If there are external heat sources, the temperature of the battery would not drop, but the effect of the internal causes is deactivated if there is no battery current, and therefore the temperature can drop further. Therefore, an alarm signal which indicates irregular charging of the battery is generated by the evaluation unit only when the temperature drops. As a result, it can again be concluded that the battery is in a damaged state in which the ability to charge the battery is reduced. This state is also called a "degraded battery".

Therefore, the method can advantageously be used to draw a distinction between elevated battery temperatures due to internal heating of the battery and heating owing to external heat sources. No additional sensors are required in this case and the battery also does not need to be protected against external influences, for example by a housing, in order to screen out the effects of said external influences.

If it is possible in a vehicle to disconnect a damaged battery from a voltage source or to slow down the power supply or the vehicle, a risk minimization strategy is to implement zero-current control. Since this is already initiated when an elevated temperature gradient is determined, a particular advantage is that mitigation of the situation begins as early as immediately after the elevated temperature gradient is determined.

The method is suitable for monitoring batteries of motor vehicles, wherein the motor vehicles may be, in particular, plug-in electric vehicles or plug-in hybrid vehicles of which the battery can be repeatedly charged without supervision by being connected to a local mains system overnight. However, certain embodiments can also be extended to other applications and is suitable, for example, for monitoring the charging process of batteries in aircraft too.

The determined temperature values can be directly or indirectly transmitted to the evaluation unit in this case. Furthermore, the evaluation unit need not be an independent module, but rather its functionality can also be formed by interaction between a plurality of individual modules. The alarm signal which is generated by the evaluation unit can furthermore be processed in different ways in this case. For example, a kind of flag may be activated, it then being possible for said flag to be taken into account in different ways by the vehicle system.

The method is used, in particular, during a charging process of the battery, and the battery is part of a low-voltage system of a motor vehicle. By way of example, said method can be used for monitoring the charging process of rechargeable lead-acid batteries, but can also be employed when charging rechargeable lithium-ion batteries.

The internal temperature (T) of the battery can be determined in different ways in this case, wherein said internal temperature is usually only estimated. Therefore, "internal temperature" of the battery also denotes a temperature which corresponds only approximately to the temperature in the interior of the battery. In this case, the measured temperature of a temperature sensor at a pole of the battery can be used, for example, in order to indirectly ascertain the internal battery temperature therefrom. However, other methods for determining or estimating the internal battery temperature can also be used. Said methods may be, for example, models which use temperatures in the close vicinity of the battery.

In one embodiment, the internal temperature (T) of the battery is first periodically detected after initiation of zero current control once a defined time has passed. The battery is therefore given time to cool down before its temperature is detected and evaluated again. It can further be provided that the evaluation unit only generates an alarm signal if the temperature (T) has fallen at least by a prespecified amount after suppression of the battery current. Therefore, any drop in the temperature is not assessed as critical, but rather only a drop by a minimum amount.

Furthermore, it is provided that the charging process of the battery is continued by driving the charging voltage if the internal temperature (T) of the battery has not fallen after the defined time has elapsed. As a result, zero-current control of the battery is deactivated and the normal charging process is continued.

In one embodiment, temperature signals are conditioned by the evaluation unit before the temperature gradient ($T_{Grad}$) is determined in this case. This has the particular advantage that the system can be better protected against signal disturbances between the sensor or a communications network and the evaluation unit or within a cabling arrangement. Disturbances of this kind could otherwise cause brief measurement errors, and faulty temperature gradient determination could lead to false alarms.

In this case, conditioning of the temperature data preferably provides, in particular, that the average value of the temperature values in a defined monitoring interval $T_{Monitor}$ is calculated, wherein only the temperature values which fall between an absolute maximum and an absolute minimum are taken into account when calculating this average value. An outlying temperature value is rejected and not used when calculating the average value if the change in temperature between two successive temperature values within the monitoring interval $T_{Monitor}$ exceeds a defined limit value. This conditioning of the temperature data in the form of a sliding average value calculation prevents extreme or improbable temperature values, which can lead to a measurement error being inferred, being taken into account during the subsequent determination of the temperature gradient.

This signal conditioning can be supplemented by the procedure that temperature values which are assessed as being outlying and are rejected are nevertheless used for calculating the average value when the time within which temperature values have been continuously rejected reaches a defined limit value. In this way, the temperature gradient can be calculated and corrected if the temperature has actually changed, even if corrupted temperature data has, over a long time period, prevented this change from being registered.

A alarm signal can then be utilized in various ways. An alarm signal of the evaluation unit is accompanied, for example, by a warning indication in the region of the dashboard of a vehicle, it being possible for this warning indication to be realized by a warning lamp. In this way, the driver of a vehicle is informed about the critical state of the battery and can initiate corresponding countermeasures. In the process, servicing personnel can be informed by means of fault codes for diagnosis purposes.

Furthermore, risk minimization strategies can be initiated, wherein, for example, the battery voltage can be adjusted such that negative effects are minimized. In particular, the setpoint voltage value of the charging voltage can be set such that the current into the battery and out of the battery is minimized. Furthermore, systems which are operated by the battery can be switched off, or the battery can be disconnected from the system. This can be realized, for example, by a relay, in particular a solid-state relay (SSR).

Since algorithms for identifying batteries with issues often generate fault messages even though the battery is intact, it can however be provided in this case that, for example, a warning indication in the dashboard and/or a fault code in a diagnosis system are/is generated only when the evaluation unit has generated a defined number of alarm signals within several successive phases of operation. By way of example, an irregular charging process is identified only when an alarm signal which indicates a battery with issues has been generated at least three times in the last five operating phases.

Further advantages, special features and expedient developments can be found in the dependent claims and the following description of preferred exemplary embodiments with reference to the drawings.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
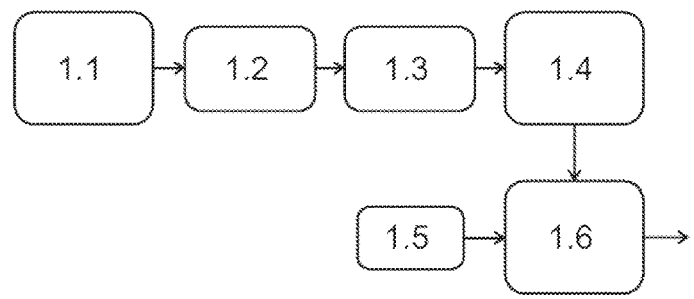
FIG. 1 shows the basic diagram of a method for monitoring the state of a battery by means of a temperature gradient and a limit value.

FIG. 1 shows the basic diagram of an embodiment of the method for monitoring the state of a battery by means of a temperature gradient and a corresponding limit value. In this case, in step 1.1, the internal temperature of the battery is determined by means of a battery monitoring sensor (BMS) which is attached to a pole of the battery. This can be carried out with a known pole-niche sensor. The battery temperature which is obtained in this way can be conditioned in steps 1.2 and 1.3. By way of example, an average value calculation can be carried out in this case, and the temperature values which are conditioned in this way are then supplied to an evaluation unit. In step 1.4, this evaluation unit carries out a continuous temperature gradient calculation by dividing the change in temperature $\Delta T$ in a specific interval by the change in time $\Delta t$ in this interval ($T_{Grad}=T_2-T_1/t_2-t_1$). In step 1.6, the temperature gradient $T_{Grad}$ obtained in this way is compared with a limit value 51 which was previously calibrated in step 1.5 and stored in the evaluation unit. If the temperature gradient $T_{Grad}$ reaches this limit value 51 or exceeds said limit value, this is assessed as an irregular state of charge. The evaluation unit therefore generates a signal which can be further processed in different ways. In this case, the signal indicates that the battery exhibits development of gas and/or a sign of damage.

By way of example, an average value calculation or a sliding average value calculation can be employed for signal conditioning. In this case, the following steps are carried out and the following conditions are taken into account:

The temperature signal is averaged over a calibrated time period $T_{Monitor}$.

Only temperature values which fall between an absolute maximum and a possible minimum are used for calculating the average value.

A deviation between two successive temperature values which lie within the minimum and maximum limits must not exceed a further predefined limit value within the monitoring time period $T_{Monitor}$. If this limit value is overshot, the deviating temperature is not used when calculating the average value. This signal conditioning is preferably carried out before the evaluation unit calculates the temperature gradient.

This filter algorithm therefore removes implausible temperature values which can be produced due to disturbances in the system, and replaces said implausible values with plausible values.

Figure 2:
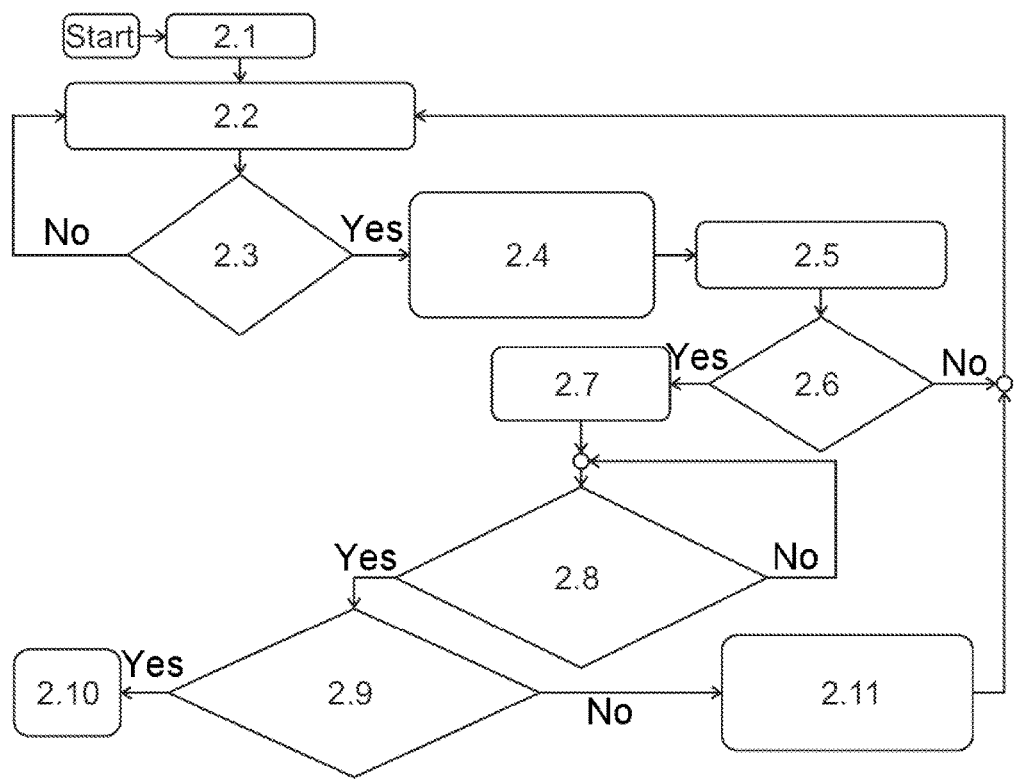
FIG. 2 shows the diagram of an embodiment of the method in which method the charging voltage is driven at elevated temperature gradients.

FIG. 2 shows the diagram of an embodiment of the method in which method the charging voltage is driven when elevated temperature gradients are determined. This algorithm can also be called active monitoring of the temperature gradient in order to identify irregular states of charge, in particular in the case of a rechargeable lead-acid battery. In this case, the algorithm is called "active" because it effectively controls the setpoint voltage value as part of the identification process. In this case, a time stamp TimeStamp is initially set to zero in step 2.1 after the algorithm is started. Then, in step 2.2, the time since the last gradient calculation is determined (t-TimeStamp). If the result of this test in step 2.3 shows that a new gradient calculation is pending, the temperature gradient $T_{Grad}$ is calculated on the basis of the abovementioned formula in step 2.4. In step 2.5, the respective time stamp is stored as $t_2$ and a temperature stamp is stored as $T_2$. If the temperature gradient $T_{Grad}$ is above a limit value S1 (MaxTempGrad) in the comparison in step 2.6, the battery current is actively set to zero in step 2.7 by zero-current control being activated. In step 2.8, the current time t and the time stamp TimeStamp are used to determine whether a specific time period GradMonPeriod has elapsed. If this is the case, the battery temperature BattTemp is periodically detected and, in step 2.9, determination in respect of whether said battery temperature has fallen is carried out. In this case, determination in respect of whether the temperature has fallen by a specific amount MinTempDecrement is carried out (TempStamp−BattTemp>= MinTempDecrement ?) in particular. If this is the case, this is identified as an irregular state of charge in step 2.10. If this is not the case however, the time stamp is stored as $t_2$ and the temperature stamp is stored as $T_2$, and zero-current control is deactivated. The charging process of the battery can then be continued.

Zero-current control regulates the setpoint voltage value of the power supply so that the battery current is always zero. Zero-current control of this kind can be realized, for example, with a proportional controller. In this case, an estimation of the no-load voltage of the battery (UOCV) and the measured battery current ($I_{Batt}$) are included in the control operation. The measured current ($I_{Batt}$) is multiplied by a calibrated actuating factor $K_p$ and added to the estimated no-load voltage UOCV in order to determine from this the setpoint value for the voltage which leads to a battery current of zero.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for monitoring a battery comprising:
by a processor,
responsive to a rate of battery temperature increase exceeding a threshold value during a charging process of the battery, driving a charge voltage such that there is no battery current;
responsive to a drop in the battery temperature following the driving while there is no battery current, generating an alarm signal; and
responsive to an absence of the drop following the driving, further driving the charge voltage such that there is battery current to continue the charging process of the battery.

2. The method of claim 1, wherein the generating is performed only if the drop occurred a predefined time after the driving.

3. The method of claim 1, wherein the generating is performed only if the drop exceeds a predefined amount.

4. A method for monitoring a state of a battery comprising:
during a charging process of the battery, determining a plurality of internal temperature values of the battery in defined intervals at different time points;
determining, by an evaluation unit, a temperature gradient from the internal temperature values by dividing a change in temperature values in one of the intervals by a change in time during the one of the intervals;
generating, by the evaluation unit, a signal when the temperature gradient reaches a limit value,
in response to a presence of the signal, driving a charging voltage of the battery such that there is no battery current;
in an absence of the battery current, detecting an internal temperature of the battery; and
in response to a drop in the internal temperature following the driving, generating by the evaluation unit an alarm signal, wherein the charging process of the battery is continued by driving the charging voltage responsive to the internal temperature of the battery not dropping after a defined time has elapsed.

5. The method of claim 4, wherein the internal temperature of the battery is first periodically detected following the driving once a defined time has passed.

6. The method of claim 4, wherein the evaluation unit only generates the alarm signal if the internal temperature drops by at least a prespecified amount after the driving.

7. The method of claim 4, wherein the battery is part of a low-voltage system of a motor vehicle.

8. The method of claim 4, wherein the internal temperature of the battery is detected via a temperature sensor at a pole of the battery.

9. The method of claim 4 further comprising conditioning temperature signals before the temperature gradient is determined.

10. A method comprising:
operating, by a processor, a battery such that there is no battery current responsive to a rate of battery temperature increase exceeding a threshold value during battery charging;
generating an alarm signal responsive to a drop in battery temperature while there is no battery current; and
continue the battery charging responsive to an absence of the drop following the operating.

11. The method of claim 10, wherein the generating is performed only if the drop occurred a predefined time after the operating.

12. The method of claim 10, wherein the generating is performed only if the drop exceeds a predefined amount.

* * * * *